No. 714,030. Patented Nov. 18, 1902.
P. R. REEVES.
GATE.
(Application filed Apr. 9, 1902.)
(No Model.) 2 Sheets—Sheet 1.
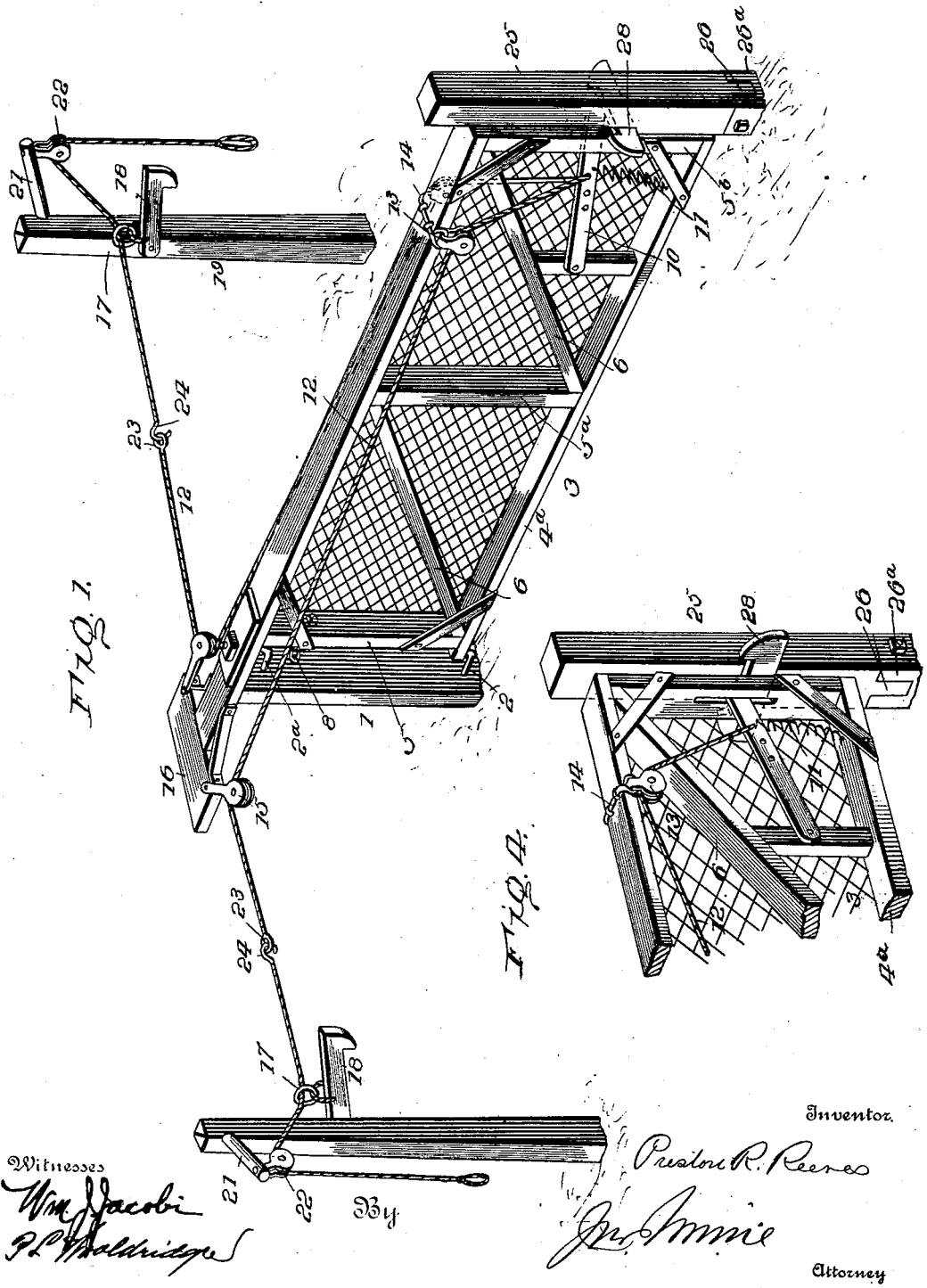

No. 714,030. Patented Nov. 18, 1902.
P. R. REEVES.
GATE.
(Application filed Apr. 9, 1902.)
(No Model.) 2 Sheets—Sheet 2.
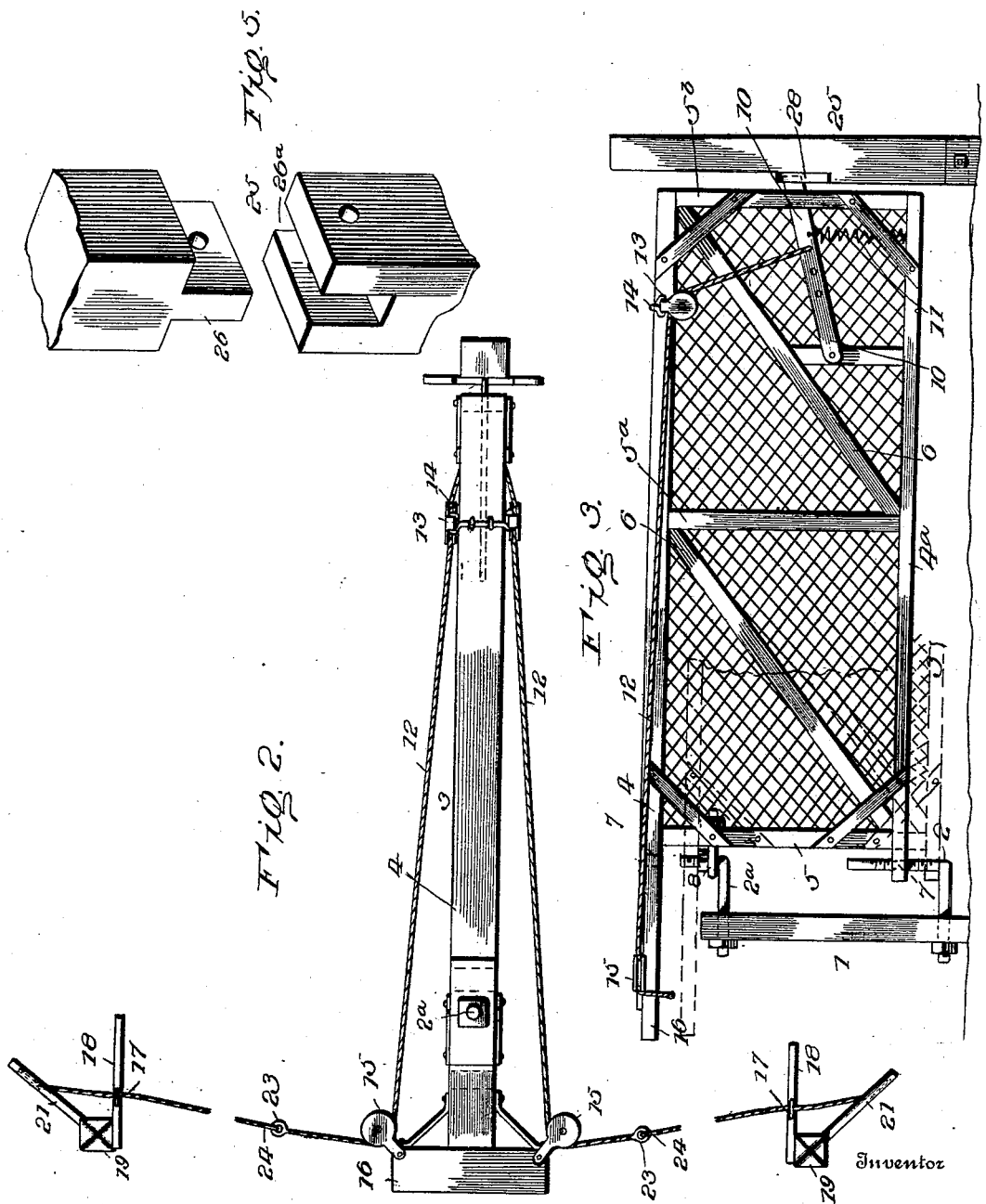
Witnesses
Inventor
Preston R. Reeves
By
Attorney

UNITED STATES PATENT OFFICE.

PRESTON R. REEVES, OF OSSIAN, IOWA.

GATE.

SPECIFICATION forming part of Letters Patent No. 714,030, dated November 18, 1902.

Application filed April 9, 1902. Serial No. 102,051. (No model.)

*To all whom it may concern:*

Be it known that I, PRESTON R. REEVES, a citizen of the United States, residing at Ossian, in the county of Winneshiek and State of Iowa, have invented certain new and useful Improvements in Gates; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in that class of gates where the latch-operating mechanism is conveniently located by the side of the approaches to the gateway.

The object of the invention is to provide a gate structure which can be conveniently elevated from the ground to permit of its being easily opened to avoid obstructions—such, for instance, as snow or the like.

A further object of the invention is to construct and arrange the latch-post in such manner that it may also be readily and conveniently removed for the passage of an unusually wide vehicle.

Many other objects and advantages will be hereinafter referred to, and be particularly pointed out in the claims.

In the drawings forming a part of this specification, Figure 1 is a perspective view of my improved gate. Fig. 2 is a top plan view. Fig. 3 is a side elevation of the gate raised to avoid snow or the like. Fig. 4 is a detail perspective view of the latch-post and the adjacent end of the gate. Fig. 5 is a detail perspective view of the lower end of the latch-post.

The numeral 1 indicates a hinge-post provided with L-shape hinge members 2 and $2^a$, threaded to receive clamping-nuts to fasten them to the post. The upper member $2^a$ has its vertical portion likewise threaded to receive a nut, while the corresponding portion of the member 2 is void of threads.

The gate 3 is preferably composed of parallel bars 4 and $4^a$, vertical bars 5, $5^a$, and $5^b$, and diagonally-arranged braces 6. Bars 4 and $4^a$ extend beyond the vertical bar 5, the bar 4 being considerably longer than $4^a$. Perforations 7 in the bars 4 and $4^a$ receive the vertical portions of the hinge members 2 and $2^a$, and adjacent these openings I provide suitable plates to prevent the wearing away of the contacting parts.

An eyebolt 8 is fixed to the vertical bar 5, the eye thereof being in alinement with the perforations 7. During the winter season gates of this type cannot be operated when the snow is on the ground. Hence the eyebolt 8 is arranged as shown. To raise the gate, the upper bar 4 is disengaged from the hinge member $2^a$, the eyebolt 8 is then slipped over the said member $2^a$, and the nut thereof is screwed in place. The lower member 2, being longer than the member $2^a$ acts merely as a guiding medium.

A latch 10 is pivoted to the gate and is normally held down by a spring 11. Ropes, chains, or the like 12 are connected to the latch 10 and pass over pulleys 13, carried by a bar 14, from whence the said ropes pass over pulleys 15, carried by a braced cross-bar 16, mounted at the outer end of the bar 4. From the pulleys 15 the ropes pass through eyes 17, mounted on catches 18, which are pivoted to the catch-posts 19 alongside the roadway. Arms 21 extend from the posts 19 and bear pulleys 22, over which the ropes finally pass, a suitable hand-grip or weight being arranged at the ends to normally keep the ropes taut. To permit ready taking up of the ropes or for replacing the same, which frequently happens in gates of this kind, I provide an eye 23 on one section of the rope and a hook 24 on the coöperating section, so that should the rope break or become tangled it can be quickly and neatly replaced.

The latch-post 25 is made in two sections, the upper section having formed at its lower end a tenon 26, while the lower section is provided with a mortise $26^a$ to receive said tenon, a bolt or the like being employed to secure the two sections together. It will be observed in this connection that the corners are square and fit each other snugly, so that only one fastening is required to make a strong and substantial connection. At a point adjacent the latch 10 the post is cut away, and adjustably mounted therein is a double-beveled catch 28, which receives the latch when the gate is closed.

The operator to open the gate pulls one of the ropes 12, which raises the latch 10 out of engagement with the catch 28, and by reason of the relative location of the various posts and pulleys a continued pull of said rope causes the gate to open and in so doing contacts with the latch 18, whereupon the gate is firmly secured against accidental closing. The operator having passed through the gateway, the rope on the opposite side of the gate is pulled, which raises the latch 18, disengaging it from the latch 10, and a continued pull causes the gate to close.

It not infrequently happens that the gateway is too small to permit the passage of a vehicle of unusual width; but this objectionable feature is overcome by making the latch-post removable. Should such a contingency occur, the bolt is removed, the latch-post taken away, and the width of the gateway is considerably increased.

What I claim as new is—

1. In a gate, the combination with a hinge-post, of two angular-shaped hinge members attached to said post, a gate comprising end bars and longitudinal bars having openings, the latter bars extending beyond the said end bars, an eye in the end bar adjacent the hinge-post, the lower angular hinge member fitting in the opening in the lower longitudinal bar, and the upper hinge member fitting either the eye, or the opening in the upper longitudinal bar, substantially as described.

2. In a gate, the combination with a hinged post, two angular-shaped hinge members secured to said post, the vertical portion of the lower hinge member being longer than the corresponding portion of the upper hinge member, a gate provided with upper and lower openings, an eye secured to the gate, the lower opening always engaging the lower hinge member, while the upper hinge member is engaged with the eye when the gate is elevated from the ground and said upper hinge member is in engagement with the upper opening of the gate when said gate is lowered, substantially as described.

In testimony whereof I affix my signature in presence of two witnesses.

PRESTON R. REEVES.

Witnesses:
J. W. MEYER,
FRED J. FIGGE.